(12) United States Patent
Akashi

(10) Patent No.: US 9,810,854 B2
(45) Date of Patent: Nov. 7, 2017

(54) OPTICAL FIBER HOLDING COMPONENT, RECEPTACLE-EQUIPPED PIGTAIL, PATCH CORD, AND OPTICAL MODULE

(71) Applicant: KYOCERA Corporation, Kyoto-shi, Kyoto (JP)

(72) Inventor: Tomoyoshi Akashi, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/111,379

(22) PCT Filed: Jan. 19, 2015

(86) PCT No.: PCT/JP2015/051233
§ 371 (c)(1),
(2) Date: Jul. 13, 2016

(87) PCT Pub. No.: WO2015/108181
PCT Pub. Date: Jul. 23, 2015

(65) Prior Publication Data
US 2016/0349463 A1 Dec. 1, 2016

(30) Foreign Application Priority Data

Jan. 20, 2014 (JP) .................................. 2014-007584

(51) Int. Cl.
*G02B 6/36* (2006.01)
*G02B 6/38* (2006.01)
*G02B 6/42* (2006.01)

(52) U.S. Cl.
CPC ......... *G02B 6/3869* (2013.01); *G02B 6/4285* (2013.01); *G02B 6/4292* (2013.01); *G02B 6/3861* (2013.01); *G02B 6/3874* (2013.01)

(58) Field of Classification Search
CPC .. G02B 6/3869; G02B 6/3874; G02B 6/4285; G02B 6/4292
(Continued)

(56) References Cited

U.S. PATENT DOCUMENTS 4,753,510 A * 6/1988 Sezerman ............ G02B 6/3843
385/61
5,347,604 A * 9/1994 Go ....................... G02B 6/4201
385/90
(Continued)

FOREIGN PATENT DOCUMENTS

JP 2001-021766 A 1/2001
JP 2005-037569 A 2/2005
(Continued)

OTHER PUBLICATIONS

International Search Report, PCT/JP2015/051233, dated Apr. 7, 2015, 2 pgs.

*Primary Examiner* — Ryan Lepisto
*Assistant Examiner* — Guy Anderson
(74) *Attorney, Agent, or Firm* — Volpe and Koenig, P.C.

(57) ABSTRACT

An optical fiber holding component includes a ferrule; an optical fiber including a front end portion which is inserted into the ferrule and is fixed thereto, and includes a rear end side drawn to an outside from a rear end of the ferrule; a holder which surrounds part of the optical fiber drawn from the rear end of the ferrule and holds a rear end portion of the ferrule; and a case including a press-fitted region press-fitted to a front end side portion of the holder which is located at a position closer to a front end side than to a rear end surface position of the ferrule, the case including a covering portion situated closer to a rear end side than to the press-fitted (Continued)

region, the covering portion having an inner diameter larger than an outer diameter of the holder and surrounding the holder.

9 Claims, 6 Drawing Sheets

(58) Field of Classification Search
USPC .................................................. 385/53–94
See application file for complete search history.

(56) References Cited

U.S. PATENT DOCUMENTS

| | | | | |
|---|---|---|---|---|
| 5,434,941 A * | 7/1995 | Bechtel | ................ | G02B 6/4292 385/68 |
| 5,751,878 A * | 5/1998 | Kyoya | ................ | G02B 6/4204 385/34 |
| 7,364,370 B2 * | 4/2008 | Nishizawa | ............. | G02B 6/421 385/88 |
| 7,712,971 B2 * | 5/2010 | Lee | ................ | G02B 6/3855 385/62 |
| 9,316,796 B2 * | 4/2016 | Barwicz | ............... | G02B 6/3861 |
| 2001/0055451 A1 * | 12/2001 | Kuhara | ................ | G02B 6/4206 385/93 |
| 2002/0081066 A1 * | 6/2002 | Brun | ................ | G02B 6/2937 385/34 |
| 2002/0126961 A1 * | 9/2002 | Hirabayashi | ......... | G02B 6/3807 385/78 |
| 2005/0201690 A1 | 9/2005 | Taira et al. | | |
| 2005/0286839 A1 * | 12/2005 | Yoshikawa | .......... | G02B 6/4201 385/92 |
| 2006/0056781 A1 * | 3/2006 | Okada | ................ | G02B 6/4292 385/93 |
| 2007/0172179 A1 * | 7/2007 | Billman | ................ | G01M 11/33 385/99 |
| 2010/0272396 A1 * | 10/2010 | Komaki | ............... | G02B 6/3869 385/60 |
| 2010/0272397 A1 * | 10/2010 | Komaki | ............... | G02B 6/3869 385/72 |
| 2011/0170830 A1 * | 7/2011 | Uno | ................ | G02B 6/2746 385/88 |
| 2012/0039570 A1 * | 2/2012 | Matsumoto | ........... | G02B 6/421 385/78 |
| 2016/0047995 A1 * | 2/2016 | Ware | ................ | G02B 6/3881 385/60 |
| 2016/0077286 A1 * | 3/2016 | Yamaguchi | ........... | G02B 6/264 385/98 |

FOREIGN PATENT DOCUMENTS

| | | |
|---|---|---|
| JP | 2007-072255 A | 3/2007 |
| JP | 2009-134308 A | 6/2009 |
| JP | 2012-230275 A | 11/2012 |

* cited by examiner

OPTICAL FIBER HOLDING COMPONENT, RECEPTACLE-EQUIPPED PIGTAIL, PATCH CORD, AND OPTICAL MODULE

TECHNICAL FIELD

The present invention relates to an optical fiber holding component and an optical-receptacle-equipped pigtail, a patch cord, and an optical module using the same.

BACKGROUND ART

An optical fiber holding component is known as a component for optically connecting optical fibers together. Examples of the optical fiber holding component include an optical plug described in Patent Literature 1. The optical plug described in Patent Literature 1 includes a ferrule, an optical fiber drawn from the ferrule, a plug frame into which the ferrule is inserted, and an inner housing which holds the plug frame. The inner housing includes a locking claw for holding the plug frame.

On the other hand, there is considered a method in which a holder (plug frame) is press-fitted and fixed to a case instead of the locking claw (see Patent Literature 2). Such an optical fiber holding component 110 is shown in FIG. 6.

The optical fiber holding component 110 includes a ferrule 102 and a holder 104. The holder 104 holds part of an optical fiber 103 drawn to the outside from a rear end of the ferrule 102. To an outer peripheral surface of the holder 104, a case 105 is press-fitted. And by press-fitting the case 105 closer to a front end side of the holder 104 than a position of a rear end surface of the ferrule 102, pressure is prevented from being intensively applied to part of the optical fiber 103.

CITATION LIST

Patent Literature

Patent Literature 1: Japanese Unexamined Patent Publication JP-A 2001-21766
Patent Literature 2: Japanese Unexamined Patent Publication JP-A 2012-230275

SUMMARY OF INVENTION

Technical Problem

However, when the optical fiber holding component 110 is fixed, if it is fixed by clamping the outer peripheral surface of the holder 104, the pressure from the clamp is sometimes applied to the optical fiber 103.

The invention is in view of the above-mentioned problem, and an object thereof is to reduce the possibility that an external force locally concentrates on part of the optical fiber.

Solution to Problem

An optical fiber holding component according to one embodiment of the invention includes: a ferrule; an optical fiber including a front end portion which is inserted into the ferrule and is fixed thereto, and a rear end side drawn to an outside from a rear end of the ferrule; a holder which surrounds part of the optical fiber drawn from the rear end of the ferrule and holds a rear end portion of the ferrule; and a case including a press-fitted region press-fitted to a front end side portion of the holder which is located at a position closer to a front end side than to a rear end surface position of the ferrule, the case including a covering portion situated closer to a rear end side than to the press-fitted region, the covering portion having an inner diameter larger than an outer diameter of the holder and surrounding the holder.

In the optical fiber holding component, the holder may include a large diameter portion having a larger outer diameter than an outer diameter of a front end side of the holder, the large diameter portion may be provided in a rear end portion of the holder, a stepped surface may be provided at a front end of the large diameter portion, and a rear end surface of the case may abut against the stepped surface.

Further, an inner peripheral surface of a rear end portion of the case may be supported by an outer peripheral surface of the holder.

Moreover, the holder may be provided with a first region situated on the front end side of the holder and a second region situated closer to a rear end side of the holder than to the first region and the second region may hold the ferrule by an inner surface thereof, and an inner diameter of the first region may be larger than an inner diameter of the second region.

The press-fitted region may exists within a range of the first region.

A receptacle-equipped pigtail according to one embodiment of the invention includes the above-described optical fiber holding component and a sleeve one end of which is placed on a front end of the ferrule.

A patch cord according to one embodiment of the invention includes the above-described receptacle-equipped pigtail and an external connection ferrule which is inserted into a rear end portion of the optical fiber and fixed thereto.

An optical module according to one embodiment of the invention includes the above-described patch cord and an optical element connected to the above-described external connection ferrule.

Advantageous Effects of Invention

According to the optical fiber holding component according to one embodiment of the invention, since the press-fitted region where the case is press-fitted is located at a position closer to the front end side of the holder than to the rear end surface of the ferrule, the pressure applied from the holder to the rear end portion of the ferrule can be reduced. Since the case includes the covering portion situated closer to the rear end side of the holder than to the press-fitted region and the covering portion has an inner diameter larger than the outer diameter of the holder, it can be made difficult for pressure and the like to be applied to the outer peripheral surface of the holder when the optical fiber holding component is fixed. This makes pressure and the like difficult to be applied to the optical fiber.

Moreover, when the holder includes the large diameter portion having a larger outer diameter than the front end side of the holder, the large diameter portion is provided in the rear end portion of the holder and a stepped surface is provided at the front end of the large diameter portion, and the rear end surface of the case abuts against the stepped surface, a press-fitted region situated on the front end side of the holder and the press-fitted region of the case can be easily aligned.

Further, when the inner peripheral surface of the rear end portion of the case is supported by the outer peripheral surface of the holder, the pressure applied to the case can be easily supported by the surface of the case.

Moreover, when the first region situated on the front end side of the holder and the second region situated closer to the rear end side of the holder than to the first region and the second region holds the ferrule by the inner surface thereof and the inner diameter of the first region is larger than the inner diameter of the second region, it can be made difficult for the pressure applied to the press-fitted region of the holder to be applied to the ferrule.

According to the receptacle-equipped pigtail, the patch cord and the optical module according to one embodiment of the invention, since the above-described optical fiber holding component is provided, a receptacle-equipped pigtail, a patch cord and an optical module capable of excellently transmitting light can be obtained.

DESCRIPTION OF EMBODIMENTS

Figure 1:
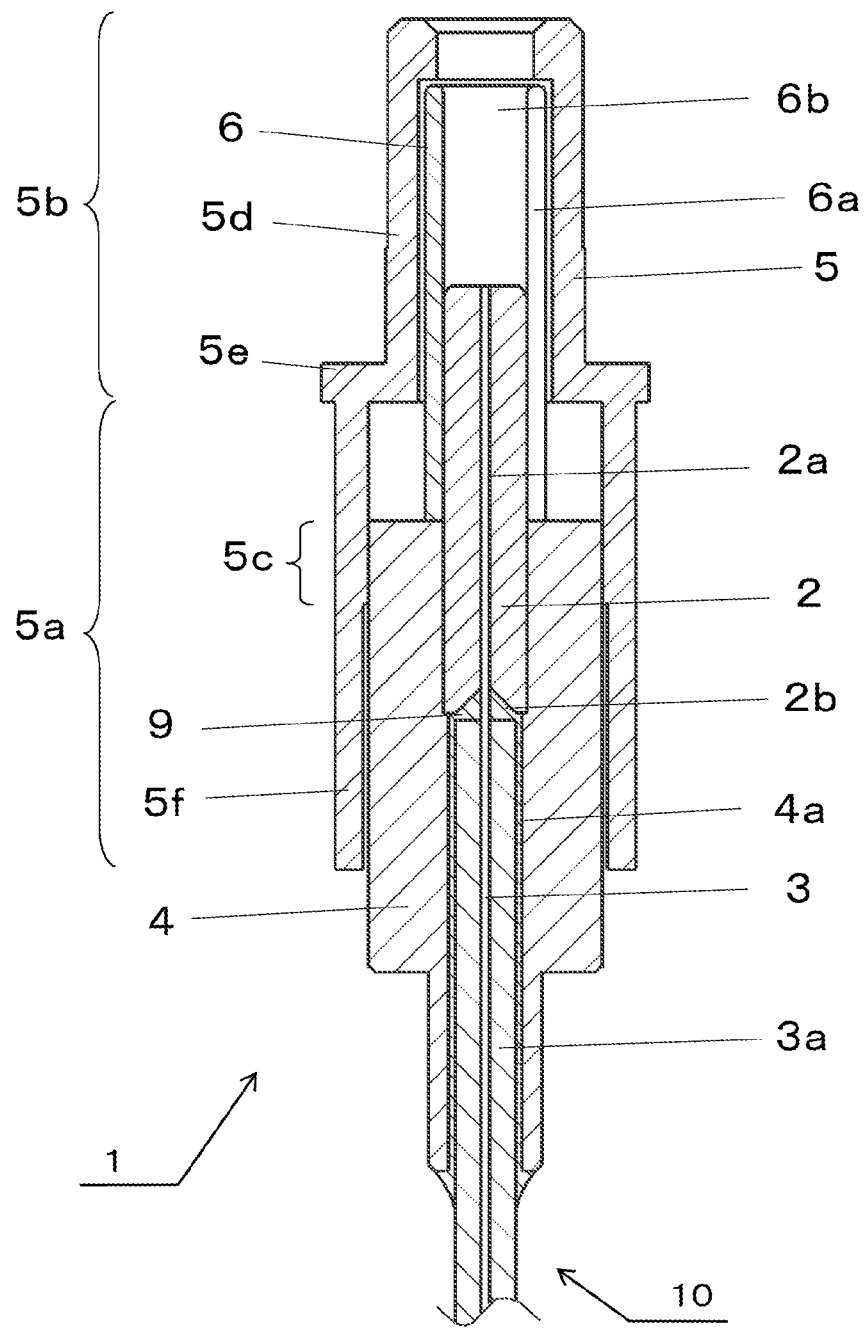
FIG. 1 is a cross-sectional view showing an optical fiber holding component and a receptacle-equipped pigtail of one embodiment of the invention.

Hereinafter, an optical fiber holding component 1, a receptacle-equipped pigtail 10, a patch cord 11 and an optical module 12 according to an embodiment of the invention will be described with reference to the drawings.

The optical fiber holding component 1 of one embodiment of the invention is formed of a ferrule 2, an optical fiber 3 drawn to an outside from a rear end portion of the ferrule 2, a substantially circular tubular holder 4 which holds the rear end portion of the ferrule 2 by a front end portion thereof, and a substantially circular tubular case 5 which is press-fitted to an outer peripheral surface of the front end portion of the holder 4.

Referring to FIG. 1, the shapes of parts of the optical fiber holding component 1 will be described. The optical fiber holding component 1 shown in FIG. 1 is a receptacle type optical fiber holding component 1 into which a plug ferrule is inserted to connect light signals. A structure in which the optical fiber 3 extends from a rear end of the receptacle-type optical fiber holding component 1 will be called the receptacle-equipped pigtail 10. Description will be given with an upper side in FIG. 1 which is a front end portion end surface of the optical fiber 3 as a front end side and a side opposite thereto as a rear end side.

Such a receptacle-type optical fiber holding component 1 has a structure into which a sleeve 6 is inserted to a front end portion of the ferrule 2 and the plug ferrule holding the optical fiber is inserted from the front end side of the sleeve 6. The receptacle-type optical fiber holding component 1 has a function of connecting light signals while aligning an optical axis of the inserted plug ferrule and an optical axis of the optical fiber 3.

The ferrule 2 is a cylindrical member including a through hole 2a passing through from the front end portion (the upper side in the figure) to the rear end portion (the lower side in the figure). In the through hole 2a of the ferrule 2, the optical fiber 3 is inserted over the entire length of the ferrule 2. The ferrule 2 is provided in order to hold the optical fiber 3.

The ferrule 2 includes a concave portion 2b formed on its rear end surface. The concave portion 2b is formed of an inclined surface which becomes deeper toward the center of the rear end surface. In the embodiment, a side surface of the concave portion 2b is linear in shape when viewed in cross section. However, a cross-sectional shape of the concave portion 2b is not limited to the linear shape. The through hole 2a is open at a bottom surface of the concave portion 2b. By this provision of the concave portion 2b on the rear end surface of the ferrule 2, a front end of the optical fiber 3 is easily directed to the through hole 2a. Moreover, in the concave portion 2b, an adhesive agent 9 for fixing the optical fiber 3 is filled so as to wrap the optical fiber 3.

The ferrule 2 includes its front end portion and rear end portion chamfered in such a manner that a corner portion between an end surface and a side surface is removed. Thereby, it is possible to reduce the possibility that, when the ferrule 2 is inserted into the sleeve 6, the sleeve 6 is damaged by coming into contact with the corner portion of the ferrule 2. Moreover, insertion into the holder 4 is facilitated.

For the ferrule 2, a ceramic material such as alumina ceramics or zirconia ceramics may be used. In particular, it is preferable that the ferrule 2 is formed of zirconia ceramics. Specifically, it is preferable that partially stabilized zirconia ceramics formed mainly of a tetragonal crystal is used. By using such partially stabilized zirconia ceramics, the abrasion resistance, moisture resistance, temperature resistance and chemical resistance of the ferrule 2 can be improved.

The optical fiber 3 is fixed with its front end portion inserted in the through hole 2a of the ferrule 2. Moreover, the rear end side of the optical fiber 3 extends so as to be drawn to the outside from the rear end of the ferrule 2. The rear end side of the optical fiber 3 is covered with a protective member 3a. The front end portion of the optical fiber 3 is fixed by the adhesive agent 9 inside the through hole 2a of the ferrule 2 and in the concave portion 2b of the rear end portion.

As the adhesive agent 9, a resin material such as epoxy resin may be used. Of the optical fiber 3, a region other than the region which is inserted into the ferrule 2 and an external connection ferrule 7 and is fixed thereto, and a region covered with the adhesive agent 9 is covered with the circular tubular protective member 3a provided so as to wrap the optical fiber 3. As the protective member 3a, a resin material such as polyester elastomer or acrylate resin may be used.

The holder 4 is a substantially circular tubular member. The holder 4 includes a through hole 4a with a constant inner diameter. The holder 4 is cylindrical in outside shape and is formed so as to be small in the rear end portion and includes a step in the middle of the outside surface. The holder 4 holds the rear end portion of the ferrule 2 by the front end portion. The ferrule 2 is held so that the rear end portion of the ferrule 2 is inserted in the through hole 4a of the holder 4. On the rear end side of the through hole 4a, part of the optical fiber 3 drawn from the rear end of the ferrule 2 is held in such a manner as to be surrounded. The holder 4 is provided so as to hold the optical fiber 3 through the protective member 3a by the rear end portion of the holder 4 in order to protect the drawn optical fiber 3. For the holder 4, a metal material such as stainless steel may be used. The holder 4 is chamfered in such a manner that the corner portion between the end surface and side surface of the front end portion is removed so that the case 5 is not damaged when the case 5 is press-fitted.

At the rear end opening portion of the through hole 4a of the holder 4, the adhesive agent 9 is provided so as to form a meniscus between the rear end surface of the holder 4 and the protective member 3a. Thereby, when the optical fiber 3 and the protective member 3a are subjected to external force and deformed so as to bend, the protective member 3a can be prevented from coming into direct contact with the edge of the opening portion of the through hole 4a of the holder 4. Thereby, the stress caused by contact of the protective member 3a with the edge of the opening portion of the holder 4 can be reduced. Moreover, the protective member 3a can be prevented from being scratched by being rubbed against the edge. As a consequence, the durability of the optical fiber 3 and the protective member 3a against the external force can be improved.

The case 5 is a substantially circular tubular member, and is provided so as to surround the ferrule 2. The case 5 is provided in order to protect the front end portion of the ferrule 2 and the sleeve 6 into which the ferrule 2 is inserted from coming into contact with the outside. The case 5 includes a circular tubular rear end side region 5a which is situated on the rear end side, and a substantially circular tubular front end side region 5b which is provided on the front end side of the rear end side region 5a and is smaller in inner diameter than the rear end side region 5a.

The rear end side region 5a includes a press-fitted region 5c press-fitted to a front end side portion of the holder 4. At the front end side portion, the ferrule 2 is surrounded in such a manner that a gap exists in between. The size of the gap is set, for example, to 0.15 mm to 0.3 mm.

On the rear end side of the press-fitted region 5c is provided a covering portion 5f which protects the holder 4 by covering the holder 4. In the covering portion 5f, the inner diameter is set so as to be not less than the outer diameter of the holder 4 so that no high pressure is applied to the holder 4. Preferably, the covering portion 5f is set to an inner diameter larger than the outer diameter of the holder 4 so that a gap of 0.01 mm to 0.1 mm exists with the outer peripheral surface of the holder 4. The existence of the gap can prevent the outer peripheral surface of the holder 4 from receiving pressure. It is preferable that the gap has a size where no pressure is applied to the outer peripheral surface of the holder 4 even if, for example, when the outer peripheral surface of the case 5 is clamped to fix, the case 5 is deformed by the pressure of the clamp.

The pressure applied to the holder 4 also depends on the thickness of the covering portion 5f. The thickness of the covering portion 5f is, for example, 0.1 mm to 0.5 mm. Even if the case 5 is deformed by applying the pressure to the outer peripheral surface of the case 5 and comes into contact with the outer peripheral surface of the holder 4, by the restoring force due to the elasticity of the case 5, the pressure applied to the outer peripheral surface of the holder 4 can be made lower than the pressure applied to the outer peripheral surface of the case 5. Therefore, the pressure can be reduced to some extent even if there is no gap between the holder 4 and the case 5. However, if a gap is provided, the pressure can be further reduced.

The pressure applied to the holder 4 also changes depending on the material of the case 5. For the case 5, a stainless steel material such as SUS303, a copper alloy material such as a brass material, an aluminum alloy material or the like is used. If the longitudinal elasticity moduli of these materials are high, the pressure applied to the holder 4 can be made low.

Moreover, by the provision of the covering portion 5f, when the case 5 is press-fitted to the holder 4, the covering portion 5f can be made a guide to cover the holder 4. In this way, the covering portion 5f facilitates the work of fixing the case 5 and the holder 4.

The front end side region 5b of the case 5 includes a circular tubular portion 5d having a circular tubular shape which is smaller in inner diameter than the rear end side region 5a, and a so-called flange-form extension portion 5e which is the rear end portion of the circular tubular portion 5d extending in the direction of the outer periphery. The difference in inner diameter between the front end side region 5b and the rear end side region 5a is set, for example, to $\phi 0.3$ mm to $\phi 2.4$ mm. The front end side region 5b surrounds the ferrule 2 in such a manner that a gap exists in between in the circular tubular portion 5d. The rear end side region 5a and the front end side region 5b connect together at the front end portion of the rear end side region 5a and the extension portion 5e of the front end side region 5b.

The rear end side region 5a is formed so as to be smaller in thickness than the front end side region 5b. Because of this structure, the rear end side region 5a is easier to elastically deform than the front end side region 5b, and this facilitates press-fitting to the holder 4. On the other hand, the outer diameter of the extension portion 5e of the front end side region 5b is larger than the outer diameter of the rear end side region 5a. Thereby, the strength of a boundary portion between the rear end side region 5a and the front end side region 5b can be increased. As a consequence, the holding force when the case 5 is inserted into and fixed to the holder 4 can be enhanced. The difference in outer diameter between the rear end side region 5a and the extension portion 5e is set, for example, to 0.6 mm to 2.5 mm. While the outer diameter of the extension portion 5e of the front end side region 5b is larger than the outer diameter of the rear end side region 5a in the embodiment, the outer diameter of the extension portion 5e of the front end side region 5b and the outer diameter of the rear end side region 5a may be the same outer diameter.

The case 5 is attached to the front end portion of the holder 4 so that the rear end surface of the ferrule 2 is situated closer to the rear end side of the holder 4 than to the press-fitted region 5c of the case 5. That is, arrangement is made so that a part of the holder 4 corresponding to the press-fitted region 5c where the holder 4 is press-fitted to the case 5 is in a position on the front end side of the holder 4 with respect to the axial position of the holder 4 where the rear end surface of the ferrule 2 is situated. By thus making the positions different in the axial direction of the holder 4, the pressure applied from the holder 4 to the rear end portion of the ferrule 2 can be reduced. That is, the pressure in a direction in which the inner diameter of the ferrule 2 in the rear end portion of the ferrule 2 contracts can be suppressed. As a consequence, it is possible to reduce the possibility that the force locally concentrates on the optical fiber 3 when an external force in the extension direction of the optical fiber 3 is applied. Consequently, an optical fiber holding component 1 capable of excellently transmitting light can be obtained.

The press-fitted region 5c is set, for example, to a position which is distant by 1 mm to 2 mm from the front end portion of the holder 4, and the rear end surface of the ferrule 2 is disposed, for example, at a position which is distant by 3 mm to 6 mm from the front end portion of the holder 4.

Further, it is preferable that the bottom surface of the concave portion 2b is situated closer to the rear end side than to the press-fitted region 5c of the case 5. When pressure is applied to the concave portion 2b, there is a tendency that trouble readily occurs on the optical fiber 3 in the part of the concave portion 2b. By disposing the concave portion 2b closer to the rear end side than to the press-fitted region 5c, when an external force in the direction of extension of the optical fiber 3 is applied, it is possible to reduce the possibility that trouble such as damage concentrates on the optical fiber 3 in the concave portion 2b. The concave portion 2b may be set, for example, to a position which is distant by 2.2 mm to 4.4 mm from the front end portion of the holder 4.

Figure 2:
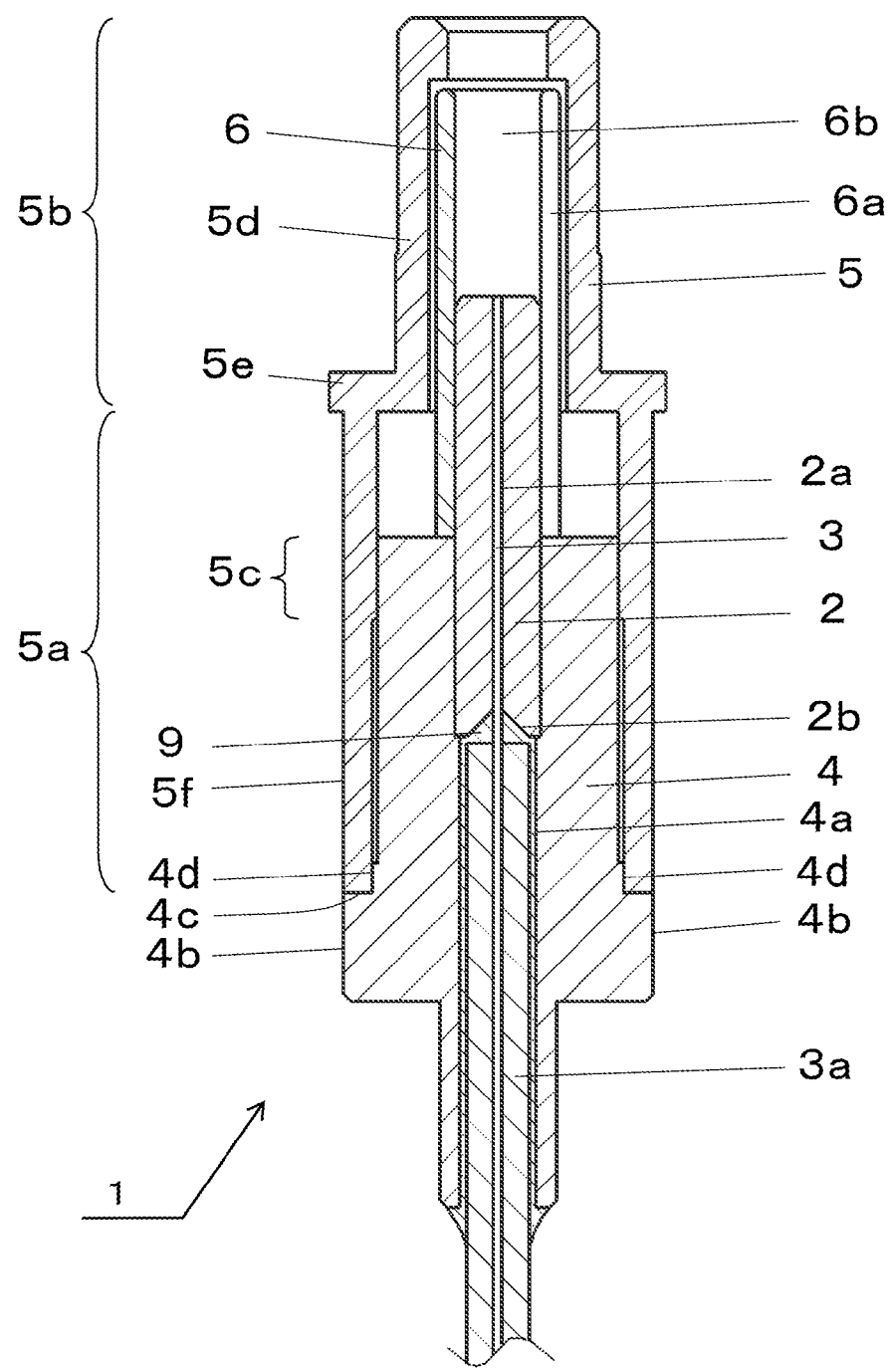
FIG. 2 is a cross-sectional view showing another example of the embodiment of the optical fiber holding component.

Referring to FIG. 2, an example of the preferred embodiment of the rear end portion of the case 5 is shown.

In the rear end portion of the case 5, a large diameter portion 4b in which the outer diameter is increased is formed on the outer peripheral surface of the holder 4. Thereby, a stepped surface 4c is formed between the large diameter portion 4b and a part on the front end side of the large diameter portion 4b. And arrangement is made so that the case 5 can be fixed to the holder 4 by making the rear end surface of the case 5 abut against the stepped surface 4c.

Thereby, when the case 5 is press-fitted to the outer peripheral surface of the holder 4, the stepped surface acts as a stopper, so that the case 5 can be prevented from being deeply press-fitted too much. And the press-fitting amount of the case 5 can be adjusted, and the position of the press-fitted region 5c on the outer peripheral surface of the holder 4 can be accurately adjusted. Moreover, the axis of the case 5 can be made difficult to incline with the position of the press-fitted region 5c as the center.

Preferably, a support portion 4d having an outer diameter fitted to the inner peripheral surface of the covering portion 5f of the case 5 is provided closer to the front end side than to the stepped surface 4c situated on the front end side of the large diameter portion 4b. By supporting the inner peripheral surface of the case 5 by the rear end portion of the case 5, even if a lateral force is applied to the case 5 or the holder 4, the case 5 can be supported by the press-fitted region 5c and the support portion 4d, so that the axis of the holder 4 and the axis of the case 5 can be prevented from being in an inclined positional relationship. The support portion 4d may be a plurality of protrusions provided in the circumferential direction of the outer peripheral surface of the holder 4.

Next, the sleeve 6 is a substantially circular tubular member including a slit 6a. To the rear end side of the sleeve 6, the front end portion of the ferrule 2 is inserted and fixed. A gap is provided between the outer peripheral surface of the sleeve 6 and the inner peripheral surface of the case 5. Thereby, when a plug ferrule (not shown) is inserted from the side opposite to the side of the sleeve 6 into which the ferrule 2 is inserted, the plug ferrule can be grasped by increasing the outer diameter of the sleeve 6. The rear end portion of the sleeve 6 is provided so as to be in contact with the holder 4. Thereby, the position displacement in the axial direction of the sleeve 6 when the plug ferrule is inserted can be reduced.

In the sleeve 6, a hollow portion 6b is formed on the front end side of the ferrule 2. Into the hollow portion 6b, the plug ferrule is inserted from the front end side. The sleeve 6 includes the slit 6a which extends from the front end portion to the rear end portion and is open at the inner peripheral surface and outer peripheral surface of the sleeve 6. Since the sleeve 6 includes such a slit 6a, the sleeve 6 can grasp the plug ferrule while increasing the inner diameter of the sleeve 6 when the plug ferrule is inserted. Thereby, it is possible to facilitate the insertion of the plug ferrule. The width of the slit 6a is set, for example, to 0.2 mm to 0.4 mm.

For the sleeve 6, like for the ferrule 2, a ceramic material such as alumina ceramics or zirconia ceramics may be used. In particular, by using the above-mentioned partially stabilized zirconia ceramics, the abrasion resistance, moisture resistance, temperature resistance and chemical resistance of the sleeve 6 can be improved. Moreover, by the provision of the slit 6a, when the plug ferrule is inserted, these can be held by appropriate elastic deformation.

Regarding the inner diameter of the sleeve 6, for example, in a case where the outer diameters of the inserted ferrule 2 and the plug ferrule are 1.25 mm, the inner diameter before the ferrule 2 and the plug ferrule are inserted is set to 1.2 mm. By the insertion of the ferrule 2 and the plug ferrule into the sleeve 6, the inner diameter can be changed, for example, to 1.25 mm, so that the ferrule 2 and the plug ferrule can be held by the sleeve 6. While the slit 6a is provided on the sleeve 6 in the embodiment, a so-called precise sleeve in which the slit 6a is not provided may be used.

The plug ferrule is a cylindrical member including a through hole passing through from the front end portion to the rear end portion. In the through hole of the plug ferrule, an optical fiber is inserted over the entire length of the plug ferrule. By the abutment of the front end surface of the ferrule 2 and the front end surface of the plug ferrule against each other, the optical fibers of the ferrule 2 and the plug ferrule are optically connected together.

For the plug ferrule, like for the ferrule 2 and the sleeve 6, a ceramic material such as alumina ceramics or zirconia ceramics may be used. In particular, by using the above-mentioned partially stabilized zirconia ceramics, the abrasion resistance, moisture resistance, temperature resistance and chemical resistance of the plug ferrule can be improved.

Figure 3:
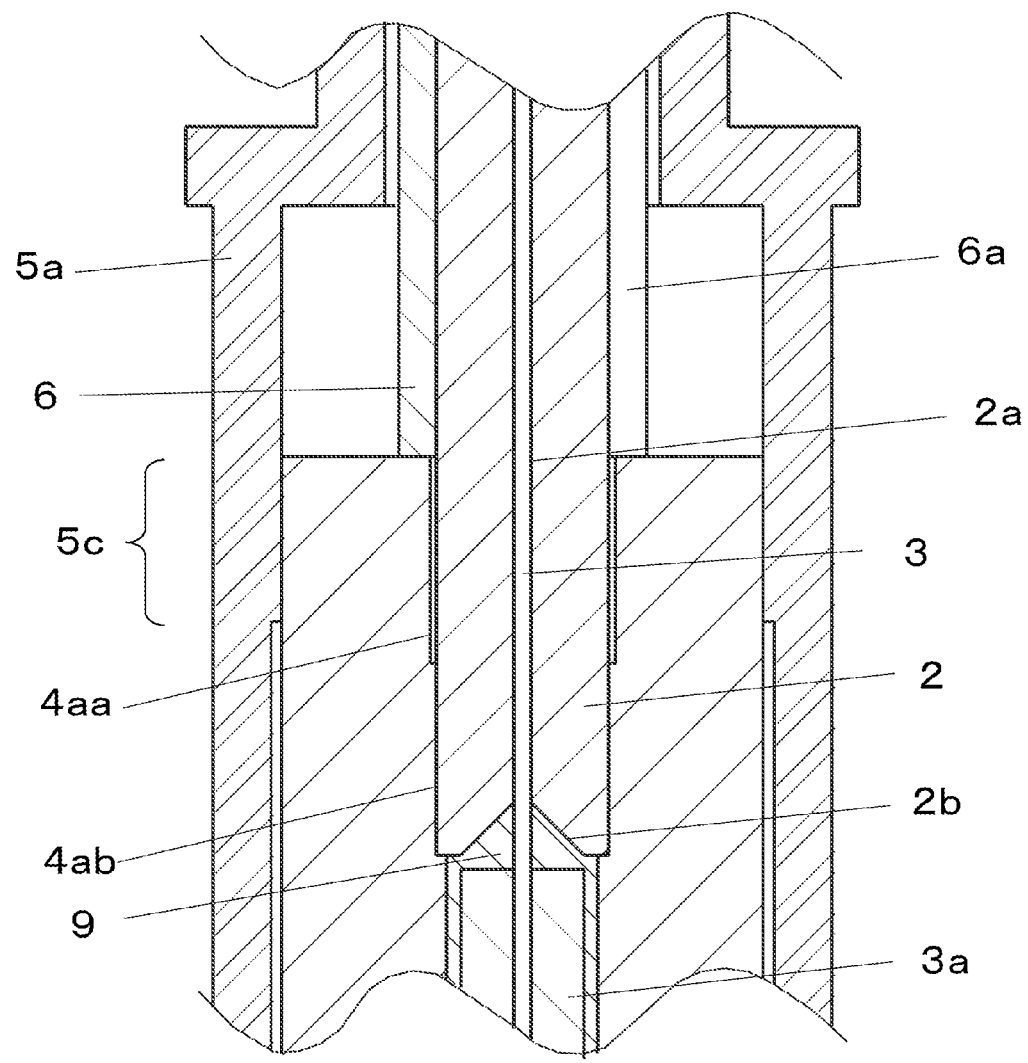
FIG. 3 is an enlarged cross-sectional view showing a front end portion of a holder in the optical fiber holding component.

An example of another embodiment of the optical fiber holding component 1 will be described with reference to FIG. 3. In FIG. 3, members having structures and functions similar to those of the above-described optical fiber holding component 1 are denoted by the same reference numerals, and detailed descriptions thereof are omitted.

In the optical fiber holding component 1 according to the embodiment, as shown in FIG. 3, the through hole 4a of the holder 4 is provided with a first region 4aa situated on the front end side of the holder 4 and a second region 4ab situated closer to the rear end side of the holder 4 than to the first region 4aa and the second region 4ab holds the ferrule 2 by the inner surface thereof. The inner diameter of the first region 4aa is larger than the inner diameter of the second region 4ab.

That is, the inner diameter of the through hole 4a is not constant, and the inner diameter of the first region 4aa situated on the front end side is larger than the outer diameter of the ferrule 2. Thereby, when the case 5 is press-fitted to the holder 4, the ferrule 2 can be prevented from being affected by the pressure from the first region 4aa of the holder 4. Thereby, the pressure applied to the optical fiber 3 through the ferrule 2 can be reduced.

Further, it is preferable that the press-fitted region 5c is provided in a part of the first region 4aa. Therefore, even if pressure is applied from the press-fitted region 5c to the holder 4, the pressure can be prevented from being applied to the ferrule 2. Therefore, the pressure applied to the optical fiber 3 can be further reduced.

Moreover, the inner diameter of the first region 4aa is smaller than the outer diameter of the sleeve 6. Thereby, when the plug ferrule is inserted, the sleeve 6 can be prevented from being pushed in. And the sleeve 6 can be prevented from receiving force from the press-fitted region 5c through the holder 4.

Moreover, when the rear end portion of the ferrule 2 is press-fitted to the through hole 4a of the holder 4, since the first region 4aa functions as a guide which inserts the ferrule 2, the work of press fitting of the ferrule 2 is facilitated, so that process failure can be reduced.

The inner diameter of the first region 4aa may be set, for example, to 1.3 mm to 2.6 mm, the inner diameter of the second region 4ab may be set, for example, to 1.25 mm to 2.5 mm, the inner diameter of the sleeve 6 may be set, for example, to 1.25 mm to 2.5 mm, and the outer diameter of the sleeve 6 may be set, for example, to 1.6 mm to 3.2 mm. These are set according to the size of the ferrule 2 such as a ferrule of a type 1.25 mm in diameter or a ferrule of a type 2.5 mm in diameter.

Next, a patch cord according to one embodiment of the invention will be described with reference to FIG. 4. By providing the external connection ferrule 7 on the rear end portion of the optical fiber 3 of the receptacle-equipped pigtail 10 shown in FIGS. 1 and 2, the receptacle-equipped pigtail 10 is called patch cord. In the description of the external connection ferrule 7, the lower part of FIG. 4 which is a tail end of the rear end portion of the optical fiber 3 is the front end side.

Figure 4:
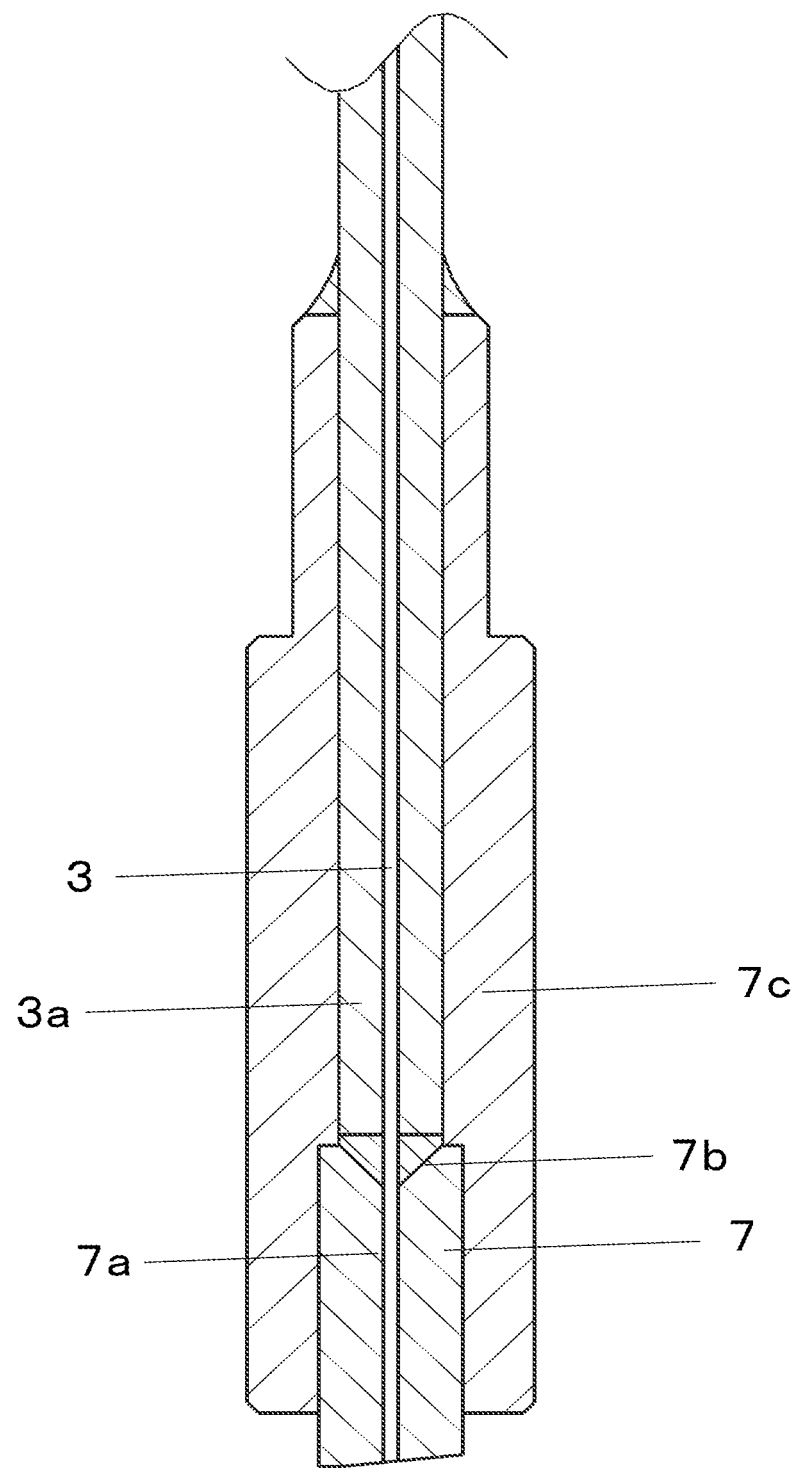
FIG. 4 is a cross-sectional view showing a part of an external connection ferrule of a patch cord of the invention.

As shown in FIG. 4, the external connection ferrule 7 is a cylindrical member including a through hole 7a passing through from the front end portion to the rear end portion. In the through hole 7a of the external connection ferrule 7, the tail end, that is, a part on the rear end side of the optical fiber 3 is inserted over the entire length of the external connection ferrule 7. In order to hold the optical fiber 3, the external connection ferrule 7 is attached to the rear end portion of the optical fiber 3 of the receptacle-equipped pigtail 10. The external connection ferrule 7 is inserted in a substantially circular tubular external connection holder 7c in such a manner that part on the front end side of the external connection ferrule 7 is exposed.

The external connection ferrule 7 includes a concave portion 7b formed on the rear end surface. The concave portion 7b is formed so as to become deeper toward the center of the front end surface. In FIG. 4, the side surface of the concave portion 7b is linear in shape when viewed in cross section. However, the cross-sectional shape of the concave portion 7b is not limited to the linear shape. The through hole 7a is open at the bottom surface of the concave portion 7b. By this provision of the concave portion 7b on the rear end surface of the external connection ferrule 7, the adhesive agent for fixing the optical fiber 3 on the rear end side of the external connection ferrule 7 can be filled so as to wrap the optical fiber 3 inside the concave portion 7b.

The external connection ferrule 7 includes its front end surface formed as an inclined surface inclined with respect to a direction perpendicular to the light transmission direction in the external connection ferrule 7. The rear end surface of the optical fiber 3 is formed as the same inclined surface. Thereby, it is possible to reduce the possibility that when light is incident in the light transmission direction in the external connection ferrule 7 from the front end side of the external connection ferrule 7, the light is reflected in a direction in which the light is incident. It is preferable that the inclination angle of the inclined surface is set to approximately 2 to 10 degrees with respect to a direction perpendicular to the axial direction of the external connection ferrule 7. Moreover, in order to reduce reflection, an anti-reflection coating is applied to the rear end surface of the optical fiber 3.

The external connection ferrule 7 includes its rear end portion which is chamfered in such a manner that a corner portion between the rear end surface and the side surface is removed. Thereby, it is possible to reduce the possibility that when the rear end side of the external connection ferrule 7 is inserted into the front end side of the external connection holder 7c, the corner portion of the external connection ferrule 7 abuts against the inner peripheral surface of the external connection holder 7c to damage the external connection holder 7c.

For the external connection ferrule 7, a ceramic material such as alumina ceramics or zirconia ceramics may be used. In particular, it is preferable that the external connection ferrule 7 is formed of zirconia ceramics. Specifically, it is preferable to use partially stabilized zirconia ceramics formed mainly of a tetragonal crystal. By using such partially stabilized zirconia ceramics, the abrasion resistance, moisture resistance, temperature resistance and chemical resistance of the external connection ferrule 7 can be improved.

The external connection holder 7c is a substantially circular tubular member. The external connection holder 7c is formed so that the inner diameter is constant, the outer diameter is small in the rear end portion, and a step is provided in the middle of the outer side surface. The external connection holder 7c holds the rear end portion of the external connection ferrule 7 in such a manner as to surround the rear end portion of the external connection ferrule 7 together with part of the optical fiber 3 drawn from the rear end of the external connection ferrule 7. The external connection holder 7c is provided in such a manner that the front end of the external connection holder 7c holds the external connection ferrule 7 and the rear end thereof holds the optical fiber 3 through the protective member 3a in order to protect the drawn optical fiber 3. For the external connection holder 7c, for example, a metal material such as stainless steel may be used.

As described above, the patch cord 11 according to one embodiment of the invention includes the external connection ferrule 7 on the rear end portion of the optical fiber 3 of the receptacle-equipped pigtail 10 from the rear end of which the optical fiber 3 is drawn. The patch cord 11 has a function of transmitting light signals through the optical fiber 3.

Here, showing an example of dimensions of the patch cord 11, production may be performed with the outer diameters of the ferrule 2 and the external connection ferrule 7 as 1.25 mm to 2.5 mm, the inner diameter of the sleeve 6 as 1.25 mm to 2.5 mm, the outer diameter of the sleeve 6 as 1.6 mm to 3.2 mm, the outer diameters of the holder 4 and the external connection holder 7c as 2.1 mm to 4.2 mm, the inner diameter of the rear end side region 5a of the case 5 as 2.1 mm to 6.2 mm, the inner diameter of the front end side region 5b of the case 5 as 1.9 mm to 3.8 mm, the length of the press-fitted region 5c in the direction of the optical axis as 1 mm to 2 mm, and the length from the rear end of the press-fitted region 5c to the bottom surface of the concave portion 2b as 3 mm to 6 mm.

Next, the optical module 12 of the invention will be described with reference to FIG. 5. The optical module 12 according to one embodiment of the invention includes the patch cord 11 and an optical element 8 connected to the external connection ferrule 7 on the rear end side of the patch cord 11. The optical module 12 has a function of converting an electric signal to a light signal or a function of converting a light signal to an electric signal. The optical module 12 may be used, for example, in a communication circuit.

The optical element 8 is accommodated in an optical element case 8a. The optical element 8 is disposed on the optical axis of the optical fiber 3, and is disposed so that light signals are connected. The optical element case 8a is attached to the external connection holder 7c.

As the optical element 8, a light emitting element or a light receiving element may be used. As the light emitting element, for example, a semiconductor laser diode may be used. As the light receiving element, for example, a photodiode may be used. As the optical element case 8a, for example, a substantially circular tubular TO-CAN type package or another optical semiconductor element accommodating package is used.

Figure 5:
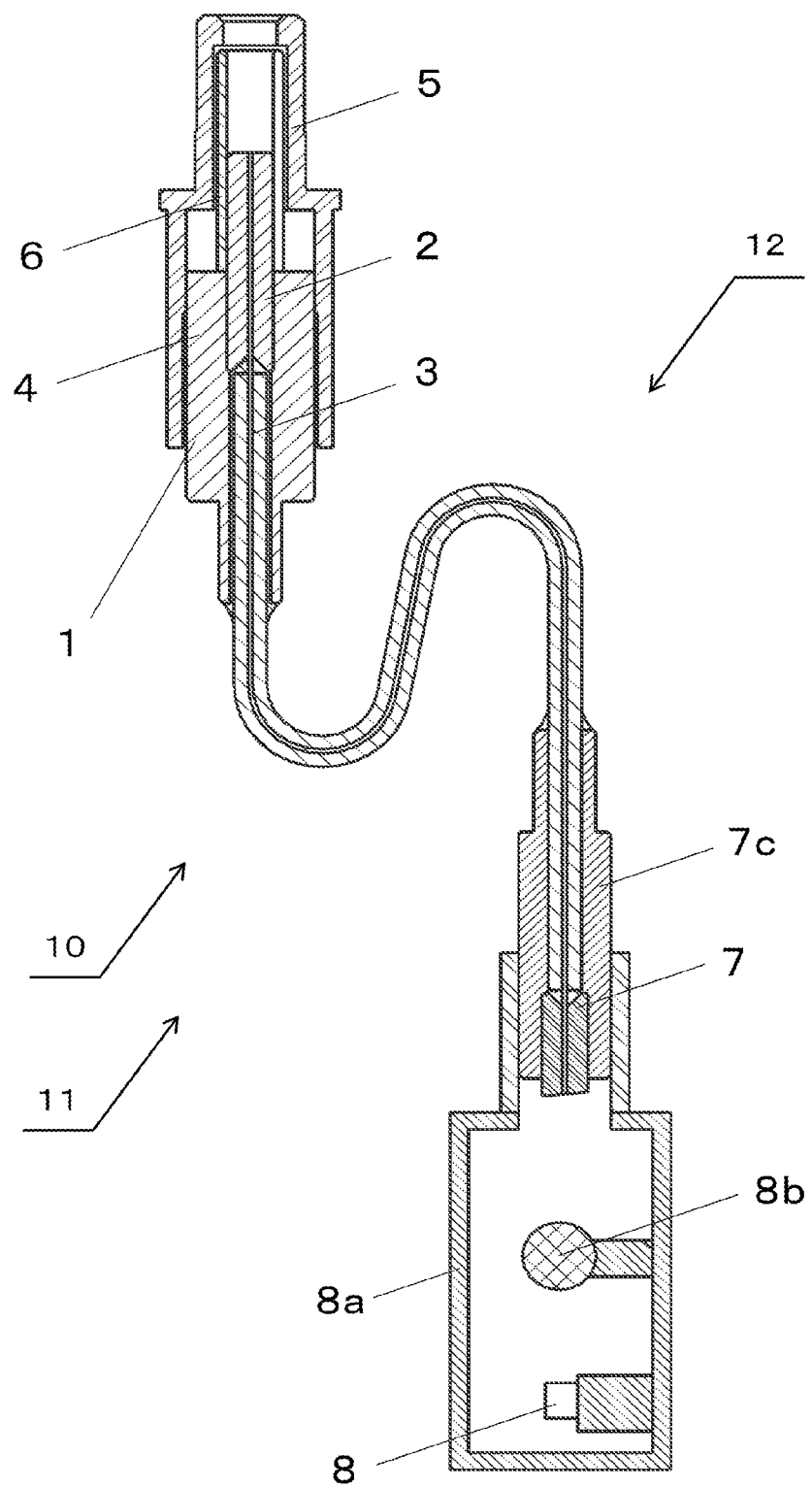
FIG. 5 is a cross-sectional view showing one embodiment of an optical module of the invention.
Figure 6:
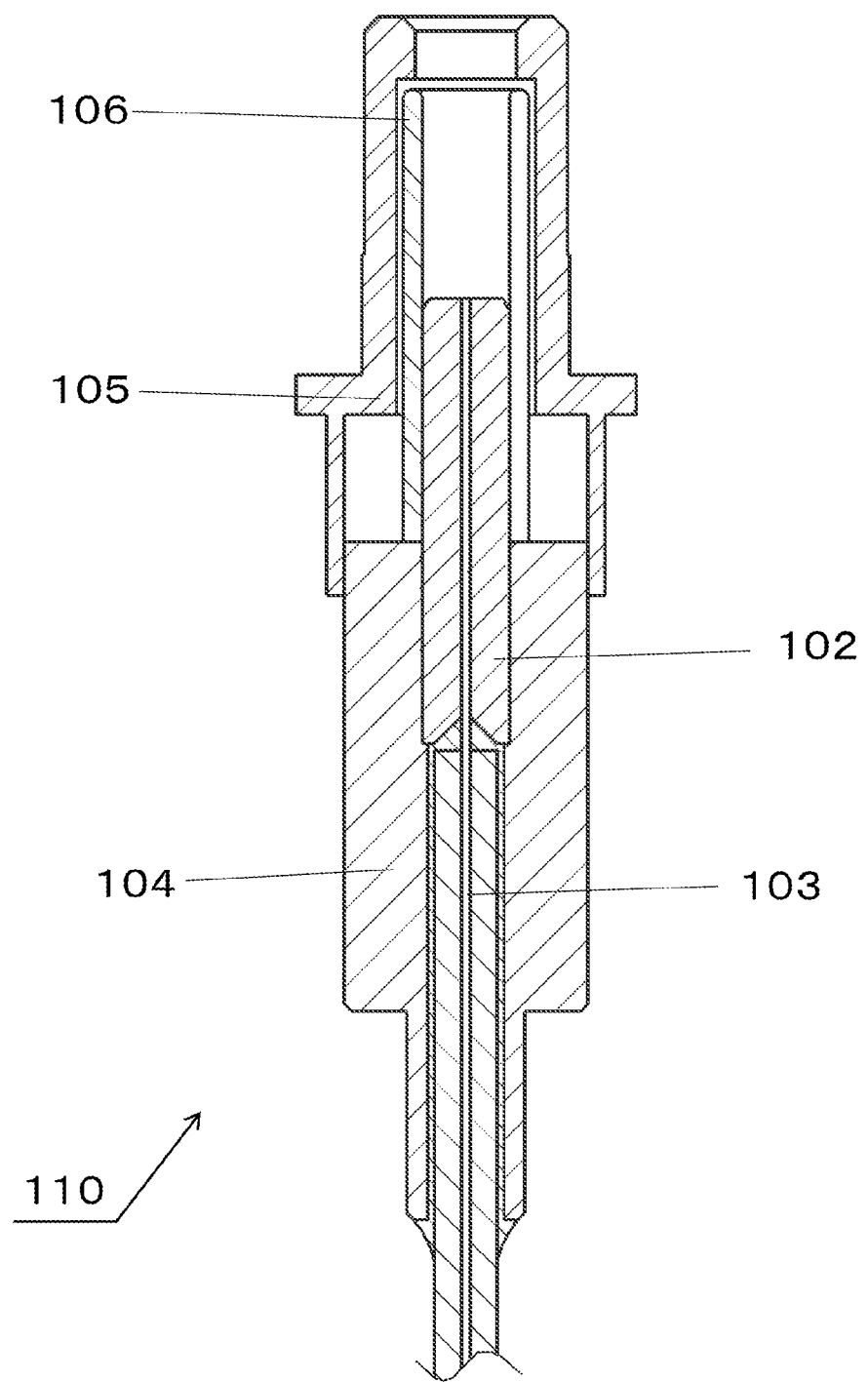
FIG. 6 is a cross-sectional view showing an example of the conventional optical fiber holding component.

As shown in FIG. 5, a lens member 8b may be provided on the optical axis of the optical fiber 3 and between the optical element 8 and the external connection ferrule 7. The lens member 8b contains, for example, amorphous glass, and a member formed in a spherical shape, a hemispherical shape, a convex lens shape, a rod lens shape or the like may be used. In a case where the optical element 8 is a semiconductor laser diode, the lens member 8b has a function of collecting the light emitted from the optical element 8 or a function of converting the light emitted from the optical element 8 to parallel light. In this case, the light emitted from the optical element 8 enters the optical fiber 3 through the lens member 8b. In a case where the optical element 8 is a photodiode, the lens member 8b has a function of collecting the light emitted from the optical fiber 3 or a function of converting the light emitted from the optical fiber 3 to parallel light. In this case, the light emitted from the optical fiber 3 enters the optical element 8 through the lens member 8b.

As described above, according to the optical module 12 of the invention, light signals can be directed to an appropriate place away from the optical element case 8a in which the optical element 8 is accommodated. And, light signals can be connected to another optical fiber through the receptacle-type optical fiber holding component 1 provided in that place. Since the optical fiber holding component 1 is used, light signals can be excellently connected.

The invention is not limited to the above-described embodiment, and various modifications, improvements and the like are possible without departing from the scope of the invention. For example, in the embodiment, the ferrule 2, the sleeve 6, the plug ferrule and the external connection ferrule 7 are described with a ceramic material as an example, a metal material or a plastic material may be used. As the metal material, a stainless steel, phosphor bronze or the like may be used. As the plastic material, an epoxy, liquid crystal polymer or the like may be used. Moreover, while the shape of the sleeve 6 is substantially circular tubular in the embodiment, it may be elliptical tubular.

REFERENCE SIGNS LIST

1: Optical fiber holding component
10: Receptacle-equipped pigtail
11: Patch cord
12: Optical module
2: Ferrule
2a: Through hole
2b: Concave portion
3: Optical fiber
3a: Protective member
4: Holder
4a: Through hole
4aa: First region
4ab: Second region
4b: Large diameter portion
4c: Stepped surface
4d: Support portion
5: Case
5a: Rear end side region
5b: Front end side region
5c: Press-fitted region
5d: Circular tubular portion
5e: Extension portion
5f: Covering portion
6: Sleeve
6a: Slit
6b: Hollow portion
7: (External connection) ferrule
7a: Through hole
7b: Concave portion
7c: External connection holder
8: Optical element
8a: Optical element case
8b: Lens member
9: Adhesive agent

The invention claimed is:

1. An optical fiber holding component, comprising:
a ferrule having a front end and a rear end;
an optical fiber comprising a front end portion which is inserted into the ferrule and is fixed thereto, and comprises a rear end side drawn to an outside from the rear end of the ferrule;
a holder which surrounds part of the optical fiber drawn from the rear end of the ferrule and holds a rear end portion of the ferrule; and
a case comprising a press-fitted region which is press-fitted to an outer peripheral surface of a front end portion of the holder which is located at a position closer to the front end of the ferrule than to a rear end surface position of the ferrule that is not covered by the press-fitted region, the case comprising a covering portion extending from the press-fitted region and surrounding the holder, the covering portion having an inner diameter larger than an outer diameter of the holder.

2. The optical fiber holding component according to claim 1, wherein the holder has a large diameter portion having a larger outer diameter than an outer diameter of a front end side of the holder, the large diameter portion is provided in a rear end portion of the holder, a stepped surface is provided at a front end of the large diameter portion, and a rear end surface of the case abuts against the stepped surface.

3. The optical fiber holding component according to claim 1, wherein an inner peripheral surface of a rear end portion of the case is supported by an outer peripheral surface of the holder.

4. The optical fiber holding component according to claim 1, wherein the holder is provided with a first region situated on a front end side of the holder and a second region situated closer to a rear end side of the holder than to the first region and the second region holds the ferrule by an inner surface thereof, and an inner diameter of the first region is larger than an inner diameter of the second region.

5. The optical fiber holding component according to claim 4, wherein the press-fitted region exists within a range of the first region.

6. A receptacle-equipped pigtail, comprising:
the optical fiber holding component according to claim 1; and
a sleeve one end of which is placed on a front end of the ferrule.

7. A patch cord, comprising:
the receptacle-equipped pigtail according to claim 6; and
an external connection ferrule which is inserted into a rear end portion of the optical fiber and fixed thereto.

8. An optical module, comprising:
the patch cord according to claim 7; and
an optical element connected to the external connection ferrule.

9. The optical fiber holding component of claim 1 wherein the case encases the front end of the ferrule.

\* \* \* \* \*